Figure 3:
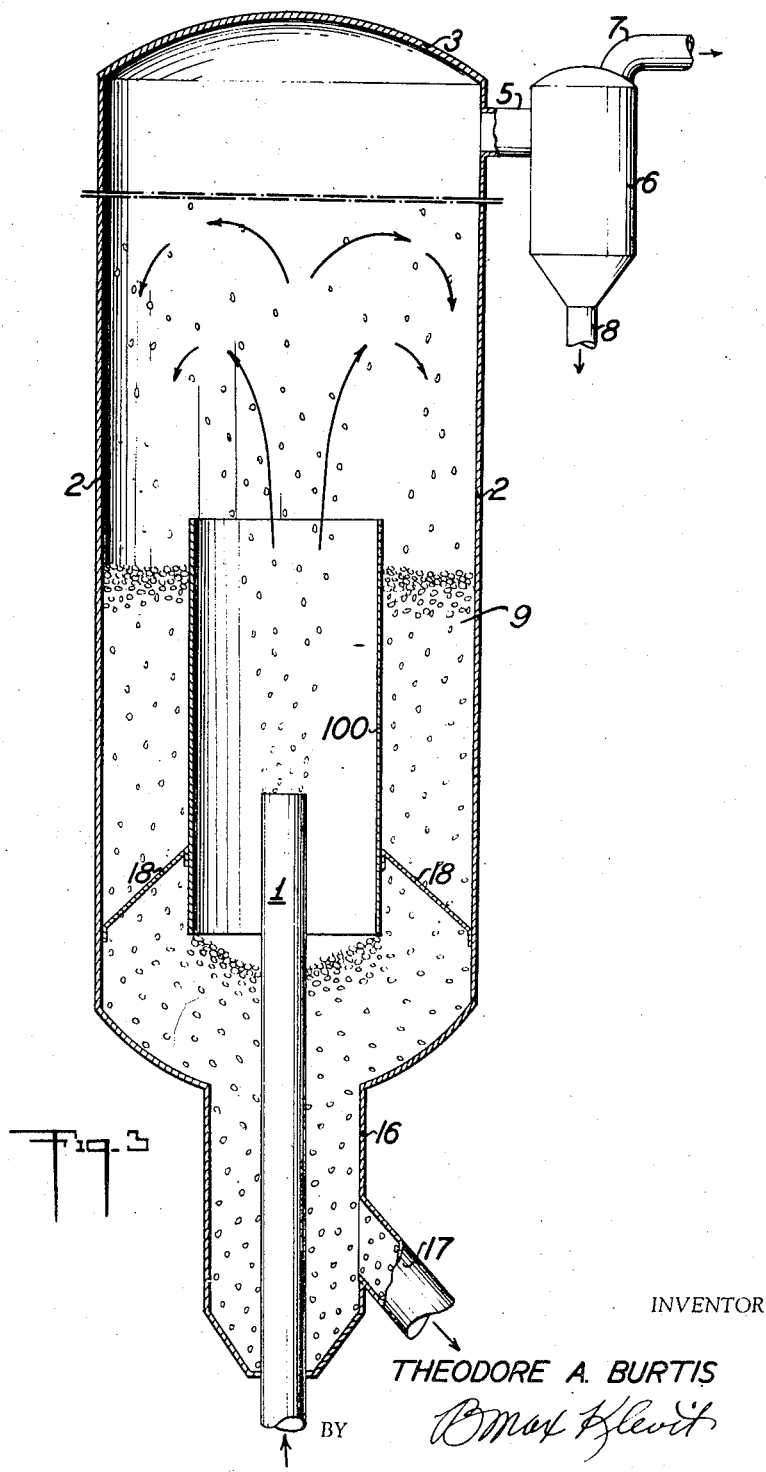

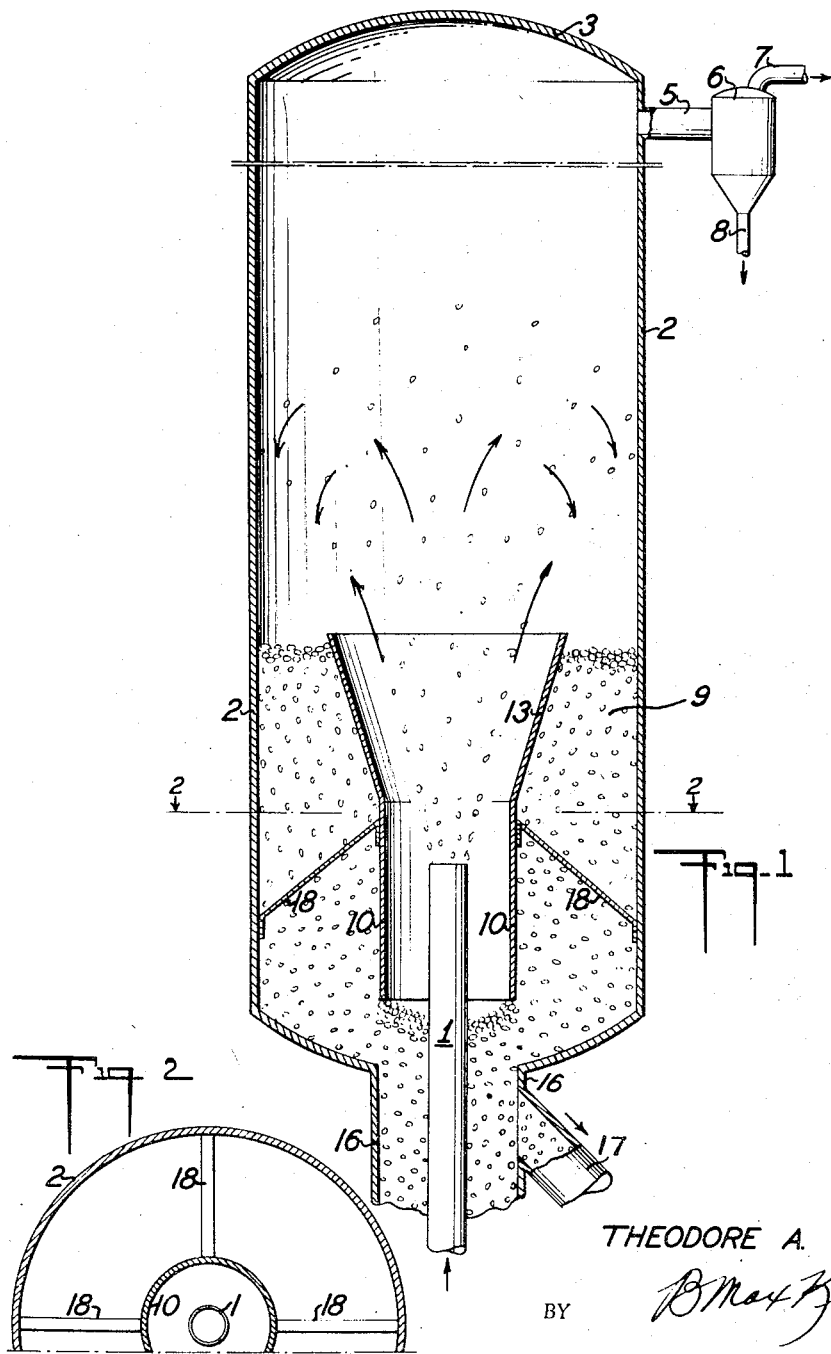

Nov. 23, 1954  T. A. BURTIS  2,695,197
SOLIDS LIFT DISENGAGER
Filed Oct. 5, 1951  2 Sheets-Sheet 2

INVENTOR
THEODORE A. BURTIS
BY
ATTORNEY

United States Patent Office

2,695,197
Patented Nov. 23, 1954

2,695,197

SOLIDS LIFT DISENGAGER

Theodore A. Burtis, Springfield, Pa., assignor to Houdry Process Corporation, Wilmington, Del., a corporation of Delaware Application October 5, 1951, Serial No. 249,906

4 Claims. (Cl. 302—59)

This invention relates to the prevention of attrition of particle-form catalysts which are employed in hydrocarbon cracking processes; and, more particularly, to a method and apparatus for controlling catalyst movement upon its discharge from the lift pipe of a gas elevator.

In systems for cracking hydrocarbons wherein the hydrocarbons are contacted with a granular or particle-form catalyst, there has been developed what is known as a moving catalyst process. This process involves initially contacting the hydrocarbons with a catalyst of the type referred to, followed by conveying the catalyst away from the reaction zone and into a regeneration zone wherein the coke which is formed on the catalyst during the reaction step is removed, the catalyst so regenerated then being reconveyed to the reaction zone for further contact with the hydrocarbons to be cracked. The solid materials with which this invention is concerned are those having an average particle size of 14 mesh or larger, and including coarse granules, as well as the typical commercial beads and whole pellets of 2 to 5 mm. diameter.

While older methods for moving the granular or particle-form catalyst between the reaction zone and the regenerating zone included mechanical means, such as bucket elevators, more recently it has been proposed to elevate the catalyst from a lower region of the system to an upper region thereof by means of a gas elevator. Elevators of this latter type in one form which is being used commercially, comprise a hopper, an elongate vertically disposed lift pipe, and a disengaging chamber at the top of the latter. In operation, the catalyst particles are permitted to flow to the hopper, generally by gravity, as from a regeneration zone, forming a confined bed therein. The lift pipe of the gas elevator extends downwardly into the hopper and beneath the level of the confined bed. A suitable gas stream is introduced into the bed within the hopper and issues upwardly therefrom through the lift pipe, whereby the catalyst particles are impelled by, and carried along with, the gas stream. After traveling upwardly through the lift pipe, the gas and catalyst particles are discharged into a disengaging chamber, the particles falling by gravity to the bottom of the chamber and the gas being withdrawn separately from the chamber.

During the commercial operation of hydrocarbon cracking processes employing a gas elevator, attrition of the catalyst particles may develop, resulting in the formation of fines and loss of catalyst through removal from the system of these fines. One cause of the attrition of the catalyst has been found to be a result of the particles issuing from the gas elevator at a relatively high velocity and impinging upon the walls and particularly the top of the disengaging chamber. In the designing of equipment for use in the gas elevator system, the disengaging chamber therefore is usually of a sufficient size to prevent the majority of particles of catalyst issuing from the lift pipe from impinging on the walls and top with a degree of force which is sufficient to cause appreciable attrition. Another cause of catalyst attrition is the contact of the particles at the completion of their free fall subsequent their separation from the elevating gas within the disengaging chamber. This latter contact is of serious consequence because all of the particles disengaged from the elevating gas within the disengaging chamber fall by gravity to a lower level for subsequent removal from the disengaging chamber and such particles are therefore all in greater or less degree subject to relatively abrupt termination of movement upon completion of their free fall. The kinetic energy of such particles at their peak velocity, i. e., termination of free fall, may thus be sufficiently great to result in appreciable attrition and the breaking down eventually to fine powder. Also, it has been found that catalyst particles having similar kinetic energy are appreciably more subject to attrition when their fall is terminated by a relatively rigid non-yielding surface such as a steel plate or the like than when their fall is terminated on a surface of catalyst even when such surface is of a relatively thin layer of catalyst.

In view of the fact that processes of the aforementioned type continually recycle the catalyst in such manner that it passes through the gas elevator system many times, it will be readily appreciated that, if a small percentage of the particles strike the surface of the disengaging chamber at high velocities coupled with the effects of all of the particles falling through long distance, rates of attrition may result that are uneconomically high because of the necessity for replacing the fines thus produced with new catalyst of proper size.

The present invention contemplates the elimination, or material reduction of attrition in systems employing gas elevators of the type described.

It is among the objects of the present invention to eliminate, or at least greatly reduce, the attrition of granular or particle-form catalyst employed in hydrocarbon cracking or other fluid-solids contacting processes, by cushioning its fall after it has been discharged from the upper end of the lift pipe of a gas elevator.

The foregoing and other objects will become more apparent after referring to the following specification and accompanying drawings wherein like reference numerals designate like parts and wherein:

Figure 1 is a fragmentary elevation, partly in section, of a separator or disengaging chamber of the type referred to earlier herein and which employs apparatus constructed in accordance with the teachings of the present invention; and Figure 2 is a partial cross-sectional view of Figure 1 taken along line 2—2; and Figure 3 is a view which is similar to that of Figure 1, but wherein there is illustrated a modified form of the apparatus of the invention.

Referring more particularly to the drawings, the numeral 1 designates the vertically extending lift pipe of a gas elevator, the upper end of which communicates with a suitable separator or disengaging chamber.

According to the teachings of the present invention, the upper end of the lift pipe 1 extends concentrically into the lower end of a superposed cylindrical vessel 2 of much greater diameter, said vessel comprising the housing of the separator or disengaging chamber.

The upper end of the cylindrical vessel 2 is provided with a concavo-convex dome 3, and a gas outlet conduit 5 which communicates with a cyclone separator 6, the latter being provided with gas and solids outlets 7 and 8, respectively.

Axially supported by brackets 18 within the cylindrical vessel 2, which as previously stated is of much larger diameter than the lift pipe 1, is a cylindrical sleeve 10 extending downwardly to below the outlet of lift pipe 1 and upwardly above the outlet of lift pipe 1 a suitable distance, such as for example about 3–5 times the equivalent of the diameter of the lift pipe. Cylindrical sleeve 10 is open at the top and bottom and is concentric with the lift pipe axis; it has diameter approximately 2–4 times that of the lift pipe. Vertically extending cylindrical member 10 carries on the top thereof an inverted frustoconical, upwardly and outwardly flared portion 13 which continues upwardly a relatively short distance such as approximately the equivalent of one to four or more lift pipe diameters, thus establishing an annulus 9 of appreciable cross-sectional area between the upper outer periphery of member 13 and the inner wall of vessel 2 at the adjacent region. The dimensions of vessel 2 are such that it extends an appreciable distance above the horizontal plane of the upper termination of member 13 and provides a free and open region in which solids are substantially completely disengaged from the lifting gas without contacting to any marked degree either the walls or top of vessel 2.

The lower end of outer cylindrical vessel 2, which constitutes the housing of the separator or disengaging chamber of the present invention, is provided with a suitable bottom portion 16 having therein a solids outlet port 17. The bottom portion 16 may have the reduced diameter configuration as represented in the drawings or may have such other form suitable to the acomplishment of the flow pattern hereinbelow described.

According to the foregoing construction and arrangement, the pellets or particles of the catalyst will move separately through and from the lift pipe of the gas elevator, through the upper portion of the concentric cylindrical vessel 10 and the superposed upper flared portion 13 and from thence into the free region thereabove within vessel 2. The mixture of gas and solids thus emerging from the lift path and entering the enlarged portion within member 10 tends to expand outwardly after leaving the restraining confinement in lift pipe 1 with a resultant diminution in the upward velocity of the emergent stream due to a decrease in the lifting effect of the lift gases caused by such expansion. Any residual lifting effect of such gases within the cylindrical vessel 10 is substantially dissipated upon entering into the enlarged area within the upper region of vessel 2 and the catalyst particles thus freed of the elevating force of the lift gas and acting under the influence of gravity lose their upward movement and eventually reversing their direction fall thereafter under the influence of gravity to a lower region within the disengaging zone; the solid particles in this movement more or less generally following a pattern similar to that indicated by the arrows in the drawings.

The lifting gas thus entering the upper section of vessel 2 becomes therein substantially devoid of lifting ability and passes, relatively free of any of the solid materials, from vessel 2 by means of gas outlet conduit 5, through cyclone separator 6 and is vented in suitable manner through line 7. Such solids as may be removed from the gas stream in separator 6 are removed therefrom through line 8 and disposed of in any suitable manner.

The particles or pellets falling as previously described under the influence of gravity descend to and through the annulus established by the upper outer periphery of member 13 and inner wall of vessel 2 and thereafter contact and become part of the surface of a gravitating bed of such solids maintained in an annular region 9 established between at least the lower portion of member 13 and substantially the entire portion of cylindrical vessel 10 and the interior wall of vessel 2. The solids thus moving downwardly as a compact bed under the influence of gravity because of configuration of the related vessels continue to descend past the lower extent of smaller cylinder 10 moving downwardly into the lower portion of vessel 2 and continue on out of the disengaging zone through the outlet port 17 for subsequent passage through the downflow portion of the system and eventually return through the lower region to the lift engaging hopper as previously described.

Such of the solids emerging from lift path 1 which do not have sufficient upward velocity to carry them beyond the upper confines of members 10 and 13 as well as such disengaged particles whose flow patterns are such that falling under the influence of gravity they enter the region described within the members 13 and 10, fall downwardly therethrough into contact with and thereafter form a part of the surface of the gravitating bed of solids moving beneath the cylindrical member 10. The major portion of the solids, however, fall into the annular region 9 between member 13 and the interior wall of vessel 2.

The system thus operates to provide adequate free space above the lift path outlet to permit substantially complete disengagement of the solids from the lifting gas without such disengaged solids coming into sharp contact with apparatus or equipment during upward movement and to provide in connection with their downward travel a relatively short path to be followed during their period of free fall, inasmuch as the major portion of the freely-falling solids contacts the surface of the bed in the annular region 9, which surface is above the discharge outlet of lift pipe 1 and considerably above the bottom of vessel 2.

With reference to Figure 3 of the drawings, there is shown a modified form of the apparatus of the present invention in which there is substituted for cylindrical member 10 and its superposed flared portion 13, a single cylindrical sleeve member 100 likewise concentric with the lift pipe axis and otherwise operating in similar manner to the system of Figure 1. The annular space 9 thus provided in Figure 2 between member 100 and the interior wall of vessel 2 has a cross-sectional area at its upper extent sufficiently enlarged to provide further collection of an increased amount of the falling disengaged solids by being extended upwardly toward but not into contact with the upwardly moving and outwardly diverging stream emerging from lift path 1.

The cylindrical sleeve 100, as likewise with the aforementioned cylindrical sleeve 10 and its superposed frusto-conical portion 13, is suitably supported and maintained in its proper position by support brackets generally indicated at 18.

Operating in accordance with the invention thus embodied in Figures 1 and 3 permits an overall reduction in the disengaging vessel length in that the level of the solids collected as a gravitating bed therein is maintained at a level substantially above the top of the lift pipe. The attrition of catalyst particles is substantially reduced by providing for a relatively short distance through which the disengaged solids may fall and by providing for collection on the surface of catalyst, which, as previously mentioned, is considerably less conducive to attrition of the catalyst particles than collection on a solid surface. The system thus described also provides for improved flow patterns and disengaging technique.

Obviously many modifications and variations of the invention as hereinbefore set forth may be made without departing from the spirit and scope thereof, and therefore only such limitations should be imposed as are indicated in the appended claims.

I claim:

1. A disengager for separating granular particles from lift gas continuously discharging in admixture therewith from the upper end of an elongated lift pipe comprising: an upright, relatively-wide vessel containing the upper end portion of said lift pipe and extending a substantial distance above the discharge end thereof sufficient to provide a disengaging region in which to effect complete gravitational deceleration of the major portion of said particles, said vessel being of much greater cross-sectional area than said lift pipe, a tubular sleeve within said vessel, concentric to and radially spaced between said lift pipe and said vessel, said sleeve extending substantial distances above and below the upper end of said lift pipe, thereby providing both an outer annular passage between said vessel and said sleeve and an inner annular passage between the lower portion of said sleeve and said lift pipe for conveying separate streams of disengaged particles to a lower region at the bottom of said vessel, a gas outlet communicating with said disengaging region, and an outlet for said granular particles communicating with said lower region at the bottom of said vessel and adapted to withdraw disengaged solids therefrom at a controlled rate, said outer annular passage being so arranged with respect to the discharging stream of particles as to receive a substantial major portion of said particles upon their disengagement from said lift gas.

2. A disengager as defined in claim 1 in which said tubular sleeve is adapted and arranged at its upper end to receive only a relatively minor portion of the granular particles disengaged from said lift gas.

3. A disengager as defined in claim 2 in which said sleeve extends above the upper end of said lift pipe a distance in the order of about 4 to 9 times the diameter of said lift pipe, and in which said sleeve has a minimum diameter of about 2 to 4 times that of said lift pipe.

4. A disengager as defined in claim 3 in which the upper end of said sleeve member is tapered outwardly throughout a longitudinal distance from its upper end equivalent to about 1 to 4 times the diameter of said lift pipe.

References Cited in the file of this patent

UNITED STATES PATENTS

| Number | Name | Date |
|---|---|---|
| 1,498,630 | Jensen | June 24, 1924 |
| 1,571,518 | Foster | Feb. 2, 1926 |
| 2,487,961 | Angell | Nov. 15, 1949 |

FOREIGN PATENTS

| Number | Country | Date |
|---|---|---|
| 278,858 | Germany | July 18, 1913 |